United States Patent [19]
Kawai

[11] 3,970,370
[45] July 20, 1976

[54] LENS BARREL FOR PHOTOGRAPHIC CAMERAS

[75] Inventor: Susumu Kawai, Toyohashi, Japan

[73] Assignee: Minolta Camera Kabushiki Kaisha, Japan

[22] Filed: Aug. 6, 1975

[21] Appl. No.: 602,252

[30] Foreign Application Priority Data
Aug. 12, 1974 Japan.......................... 49-96803[U]

[52] U.S. Cl................................ 350/255; 354/195
[51] Int. Cl.²........................................... G02B 7/04
[58] Field of Search........................ 350/41, 43–44, 350/46–47, 187, 255, 257, 76–77, 79; 354/195, 286

[56] References Cited
UNITED STATES PATENTS

| | | | |
|---|---|---|---|
| 2,357,326 | 9/1944 | Harris | 350/255 |
| 3,897,998 | 8/1975 | Someya et al. | 350/255 |

Primary Examiner—John K. Corbin
Assistant Examiner—Wm. H. Punter
Attorney, Agent, or Firm—Watson, Cole, Grindle & Watson

[57] ABSTRACT

A lens barrel for a photographic camera including a focussing device. An outer barrel is attached to the body of the camera and an inner barrel loosely fits within the outer barrel. This inner barrel is rotatable together with the objective lens by adjustment of the focussing device. A helical cam surface is provided at the end of the inner barrel. A back adjusting member is adjustably arranged on the outer barrel so that it contacts the helical cam surface and serves to move the inner barrel along the axial direction with respect to the outer barrel in response to an adjustment. A spring member biases the inner barrel in the direction of the helical cam surface for urging it against the back adjusting member.

10 Claims, 5 Drawing Figures

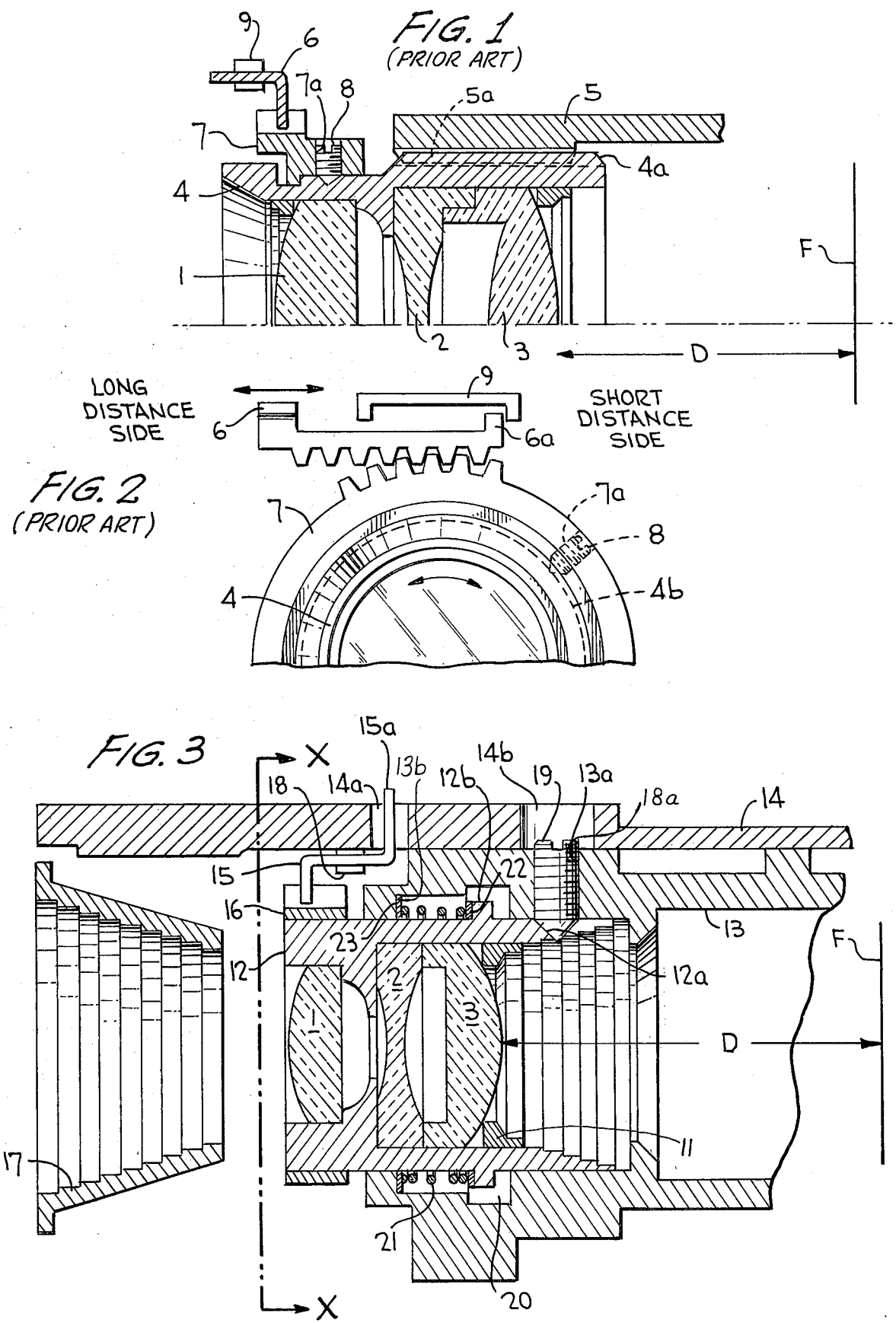

LENS BARREL FOR PHOTOGRAPHIC CAMERAS

BACKGROUND OF THE INVENTION

The present invention relates to a lens barrel for a photographic camera which includes a focussing device and also a mechanism for back adjusting.

As is well known, the lens barrel for a camera includes an outer barrel attached to the camera body, an inner barrel integrally composed with the lens system and arranged within the outer barrel and a focussing device. In previously known arrangements the inner barrel is coupled to the outer barrel by means of a helicoid screw or a pin slot coupling. The lens system is moved in conjunction with the inner barrel by adjusting the focussing device for focussing. Normally, in order to improve the accuracy of focussing with such a lens barrel, a back adjusting mechanism is provided in the lens barrel. Such a back adjustment is provided after the lens barrel has been completely assembled. After such assembly, the focussing device is adjusted so as to move the lens system to the position where the light from the infinite object focuses on an image plane of the film within the camera. The back adjusting mechanism is then adjusted so as to restrict the range of movement of the inner barrel with respect to the film plane, and to ensure that the inner barrel will be appropriately adjustable for focussing. Such an adjustment is usually referred to as back adjustment or adjustment for back focal length.

In the previously known systems where helicoid screws and pin slot couplings have been utilized for coupling the inner and outer barrels, and relatively large number of parts and corresponding increase in manufacturing costs have become a significant problem. Additionally, with such systems there is required a significant amount of time for the back adjustment to be made.

SUMMARY OF THE INVENTION

An object of the present invention, therefore, is to provide an improved and simplified lens barrel assembly having a back adjustment mechanism.

Another object of the invention is to avoid the disadvantages of previous conventional devices and to provide a lens barrel for a camera having a simple construction with a less number of parts which enables a back adjustment to be precisely made with less skill and also makes focussing possible with the same construction.

To accomplish these objectives in accordance with the present invention, the conventional helicoid screws are removed and there is provided a helical cam surface formed on the end of the inner barrel integrated with the lens system. The helical cam surface is urged against a back adjusting member arranged within the outer barrel. A spring member is provided for biasing the helical cam surface against the back adjusting member in such a manner that there is no play between the back adjusting member and the cam surface. The desired back adjustment is carried out by adjusting the position of the back adjusting member and focussing of the lens is made by rotating the inner barrel.

More specifically in this lens barrel of the present invention, the back adjusting member is either a tapered screw or an eccentric pin positioned on the outer barrel in order to be able to come into contact with the helical cam surface. The spring member, which biases the inner barrel, is provided so that the cam surface is always pressed against the back adjusting member and makes it possible to provide a precise back adjustment by merely adjusting the position of the adjusting member. The helical cam surface and the adjusting member in conjunction correspond to the conventional helicoid screw so that focussing is also easily and effectively achieved with this construction. This assembly provides all of the desired functions while the number of parts is decreased and the manufacturing cost is lowered.

BRIEF DESCRIPTION OF THE DRAWINGS

FIG. 1 is a cross-sectional view of a conventional lens barrel.

FIG. 2 is a sectional front view of a portion of the lens barrel of FIG. 1.

FIG. 3 is a cross-sectional view of a lens barrel in accordance with the present invention.

DESCRIPTION OF THE PREFERRED EMBODIMENTS

Figure 4:
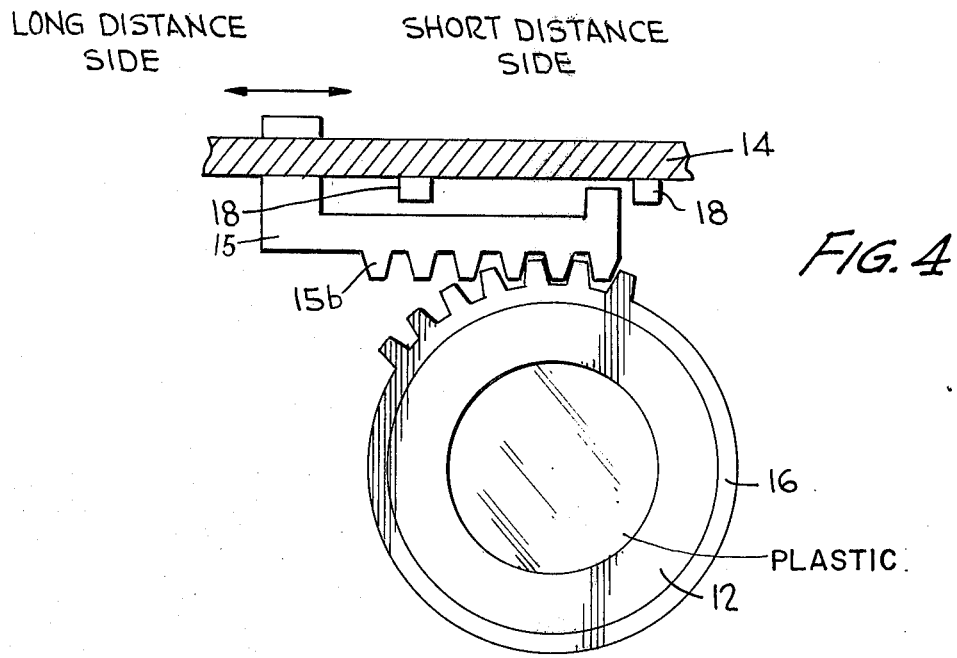
FIG. 4 is a sectional view along lines X-X in FIG. 3.

FIGS. 1 and 2 both illustrate a typical conventional lens barrel which is capable of having a back adjustment made. In this lens barrel, lenses 1, 2 and 3 are held within inner barrel 4. An outer barrel 5 is attached to the camera body, which is not illustrated. Inner barrel 4 fits within outer barrel 5 and is held in place by means of helicoid screws 4a and 5a. A rack 6 is movable from outside of the camera. A pinion 7 loosely fits around inner barrel 4 and engages rack 6. When a set screw 8 in a tapped hole 7a is tightened, pinion 7 becomes integrally coupled with inner barrel 4. Thus, when rack 6 is moved under the above conditions, inner barrel 4 is integrally rotated with pinion 7, along with lenses 1, 2 and 3 so that focussing can be accomplished. A stopper 9, which contacts projection 6a of rack 6 and is attached to either the camera body or outer barrel 5, restricts the starting position and the ending position of the axial movement of inner barrel 4.

In order to make it possible to carry out the back adjustment with such a lens barrel, pinion 7 and inner barrel 4 can be individually rotated by lossening set screw 8. After loosening the set screw, inner barrel 4 is rotated by itself so as to move lenses 1, 2 and 3 to the position where the light from an infinite object focuses on an image plane of film F within the camera. The resulting distance D between lens 3 and the image plane of the film is referred to as the back focal length. Next, rack 6 is moved to the end position of the long distance side controlled by stopper 9. Finally, set screw 8 is again tightened so that inner barrel 4 and pinion 7 are again integrally coupled. Having made such a back adjustment, when rack 6 is now moved to the end position of the long distance side to the position determined by stopper 9, lenses 1, 2 and 3 always focus on infinite objects, and alternatively when rack 6 is moved to the short distance side, the lenses can be focused on the nearer objects in dependence upon the amount of movement.

In the lens barrel of this type, however, as clearly described above, set screw 8 is the indispensable part for back adjustment, but the provision of such parts in addition to helicoid screws 4a and 5a increases the number of parts and causes a corresponding increase in the manufacturing costs. Moreover, when the back adjustment is made, operations to loosen set screw 8, to move rack 6, and to again tighten set screw 8 are needed, which requires a significant amount of time for handling a tool, such as a screw driver, and lowers the work efficiency. Furthermore, helicoid screws 4a and 5a which control the movement of inner barrel 4 have generally comparatively large pitch and even if these are precisely made, some play remains which makes precise back adjustment difficult and means that considerable skill is required.

Figure 5:
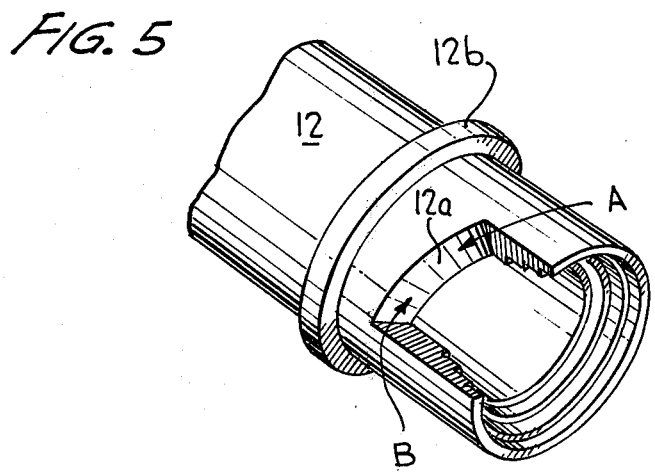
FIG. 5 is a perspective view of a portion of the inner barrel shown in FIG. 3.

FIGS. 3 to 5 illustrate an embodiment of the lens barrel in accordance with the present invention. The particular embodiment of the lens barrel illustrated is one for a small camera and is provided in the camera casing. Lenses 1, 2 and 3 correspond to the lenses of the conventional devices as shown in FIG. 1. The lenses are mounted on the inner circumference of an inner barrel 12 in a well known manner, such as by heat fitting and a ring 11. Outer barrel 13 loosely fits around inner barrel 12 and is attached to upper wall 14 of the camera by means of a screw (not shown). A focussing member 15 includes a rack 15b having a knob 15a projecting from a slot 14a formed in upper wall 14 of the camera and a pinion 16 engaging rack 15b of the focussing member. Pinion 16 is a separate member concentrically arranged around inner barrel 12 in this embodiment, but may be integrally formed with inner barrel 12. In FIG. 4, when focussing member 15 is moved in slot 14a, inner barrel 12 is freely rotated together with pinion 16 relatively to outer barrel 13. A hood 17 prevents light from impinging on lenses 1, 2 and 3 from outside of the picture angle. A stopper 18, which restricts the range of movement of focussing member 15, is integrally formed on upper wall 14 of the camera.

The rear end of inner barrel 12 which faces film plane F of the camera is provided with cam surface 12a as illustrated in FIG 3. A tapered screw 19 screwed in tapped hole 18a on outer barrel 13 contacts cam surface 12a. Cam surface 12a has a helical shape so that inner barrel 12 is advanced along its axial direction at a constant rate when inner barrel 12 is rotated, as will be further described later. Cam surface 12a is preferably inclined with respect to the radial direction so that it contacts the tapered surface of the tapered screw 19, but such an inclination to the direction of radius is not always necessary. Hole 14b is formed on upper wall 14 of the camera, at a location directly above tapped hole 13a. Hence, a screw driver (not shown) can be inserted into hole 14b for freely adjusting tapered screw 19.

On the other hand, a space 20 is formed between inner barrel 12 and outer barrel 13 and spring 21 is inserted in this space. Spring 21 contacts flange 12b of inner barrel 12 and inner surface 13b of outer barrel 13 at each end through rings 22 and 23, which rings are provided for assisting in a smooth rotation of inner barrel 12. Spring 21 urges inner barrel 12 backwards relative to outer barrel 13 so as to bias the inner barrel to cause cam surface 12a of the inner barrel to contact the tapered surface of tapered screw 19.

In accordance with this arrangement, when tapered screw 19 is driven inward, cam surface 12a of inner barrel 12 is pressed by the tapered surface of tapered screw 19 and in turn, inner barrel 12 is moved forwardly without rotation against the urging force of spring 21. When tapered screw 19 is loosened, inner barrel 12 is moved straight backward by the urging force of spring 21. Although pinion 16 is also moved in conjunction with the movement of inner barrel 12, the engaged focussing device 15 is not moved in any direction and only the position at which it is engaged by pinion 16 is moved forward or backward.

Consequently, in the lens barrel of the present invention, back adjustment is made possible by moving focussing member 15 to the long distance side to allow it to contact stopper 18 and subsequently adjusting tapered screw 19 to move inner barrel 12 to the position where the light from infinite objects focuses on the image plane of the film, i.e., the position where the back focal length D is set to the designed value. In this embodiment, back adjustment can be made very easily and still very precisely because spring 21 always presses cam surface 12a against the tapered surface of tapered screw 19, without any play being present between the two surfaces.

With such an arrangement, focussing of the lenses is accomplished by moving focussing device 15 as follows. In FIG. 4, when focussing member 15 is moved to the right (the short distance side), inner barrel 12 is rotated in a clockwise direction and the portion of cam surface 12a which is shallow cut from the rear end of inner barrel 12 (part A in FIG. 5) comes into contact with the tapered surface of tapered screw 19. Since the tapered screw is fixed, inner barrel 12 is moved forward against the urging force of spring 21 by the rotation. The light from a nearer object is thereby focused into the image on the plane of film F. Alternatively, when focussing member 15 is moved to the left as shown in FIG. 4 (the long distance side), inner barrel 12 is rotated in a counterclockwise direction and the portion of cam surface 12a which is deeply cut from the rear end of inner barrel 12 (part B in FIG. 5) comes into contact with the tapered surface of tapered screw 19. Inner barrel 12 is then moved backward by the urging force of spring 21. In this case, the light from a farther object is thereby focused on the image plane of film F. Thus, the lens barrel of the embodiment has no helicoid screw as in the conventional lens barrel of FIGS. 1 and 2, but back ajustment as well as focussing can be achieved by the joint efforts of cam surface 12a, tapered screw 19, and spring 21.

While the above description has presented one embodiment of the present invention, other embodiments of the present invention are also possible. For example, lenses 1,2 and 3 are shown as being directly attached to inner barrel 12 in the above embodiment for the sake of simplification, but lenses 1, 2 and 3 also may be attached on the inner surface of a cylinder integrally fit within inner barrel 12. Thus, inner barrel 12 can be integrally formed with lenses 1, 2 and 3. In the illustrated embodiment, such parts as diaphragm mechanism is omitted for simplification, but these parts may be included unless they obstruct the above movement of inner barrel 12. Since cam surface 12a is easily formed if inner barrel 12 is made of a molded plastic material as compared with a metal or a similar material, the present invention is the most suitable for lens barrels made of plastic, but this is not to be considered a limitation upon the invention. The use of an eccentric pin in lieu of the tapered screw in the embodiment can also provide the same result by changing the rotation angle of the eccentric pin.

It is noted that the above description and the accompanying drawings are provided merely to present exemplary embodiments of the present invention and that additional modifications of such embodiments are possible within the scope of this invention without deviating from the spirit thereof.

I claim:

1. A lens barrel for a camera comprising: an objective lens unit;
    an outer sleeve adapted to be mounted on a camera;
    an inner sleeve integrally coupled with said objective lens unit and movably mounted within said outer sleeve;
    helical cam means provided at one end portion of said inner sleeve and assisting in adjusting the focus of said objective lens unit;
    a screw threadably fitted within said outer sleeve and having an end portion engageable with said helical cam means;
    biasing means for urging said inner sleeve so as to cause said helical cam means to engage said end portion of said screw, said inner sleeve being moved in an axial direction relative to said outer sleeve through the engagement between said end portion of said screw and said helical cam means when said screw is screwed inwardly; and
    manually operable means for rotating said inner sleeve relative to said outer sleeve, said inner sleeve, when rotated, being shifted relative to said outer sleeve in the axial direction for focus adjustment through the engagement between said end portion of said screw and said helical cam means.

2. A lens barrel as defined in claim 1, wherein said helical cam means is integrally formed at the rear end of said inner sleeve.

3. A lens barrel as defined in claim 1, wherein said screw has a tapered end portion and said helical cam means has a surface engageable with said tapered end portion.

4. A lens barrel as defined in claim 1, wherein said manually operable means includes a manually operable rack and a pinion integrally mounted with said inner sleeve and engaged with said rack.

5. A lens barrel as defined in claim 1, wherein said inner sleeve is made of plastic material.

6. A lens barrel for a camera comprising:
    an objective lens unit;
    an outer sleeve adapted to be attached to a camera at a rear end thereof;
    an inner sleeve integrally coupled with said objective lens unit and movably mounted within said outer sleeve;
    helical cam means provided at one end portion of said inner sleeve and assisting in adjusting the focus of said objective lens unit;
    a screw threadably fitted within said outer sleeve and having an end portion engageable with said helical cam means;
    biasing means for urging said inner sleeve so as to cause said helical cam means to engage with said end portion of said screw, said inner sleeve being moved in an axial direction relative to said outer sleeve through the engagement between said end portion of said screw and said helical cam means when said screw is screwed inwardly; and
    manually operable means for rotating said inner sleeve relative to said outer sleeve, said inner sleeve, when rotated, being shifted relative to said outer sleeve in the axial direction for focus adjustment through the engagement between said end portion of said screw and said helical cam means.

7. A lens barrel as defined in claim 6, wherein said helical cam means is integrally formed at the rear end of said inner sleeve.

8. A lens barrel as defined in claim 6, wherein said screw has a tapered end portion and said helical cam means has a surface engageable with said tapered end portion.

9. A lens barrel as defined in claim 6, wherein said manually operable means includes a manually operable rack and a pinion integrally mounted with said inner sleeve and engaged with said rack.

10. A lens barrel as defined in claim 6, wherein said inner sleeve is made of plastic material.

* * * * *